United States Patent
Fowler et al.

[11] Patent Number: 5,943,912
[45] Date of Patent: Aug. 31, 1999

[54] CONTROL FOR AUTOMATED MECHANICAL TRANSMISSION SYSTEM

[75] Inventors: Paul Martin Fowler, Lymm; Michael Daly, London, both of United Kingdom

[73] Assignee: Eaton Corporation, Cleveland, Ohio

[21] Appl. No.: 08/749,273

[22] Filed: Nov. 13, 1996

[30] Foreign Application Priority Data

Dec. 7, 1995 [GB] United Kingdom ............... 9525055

[51] Int. Cl.⁶ ........................................ F16H 59/00
[52] U.S. Cl. ............................ 74/335; 74/336 R
[58] Field of Search ................... 74/335, 336 R, 74/473 R

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 74/866 |
| 4,648,290 | 3/1987 | Dunkley et al. | 364/424.1 |
| 5,009,128 | 4/1991 | Seidel et al. | 74/335 X |
| 5,053,959 | 10/1991 | Genise | 364/424.1 |
| 5,233,525 | 8/1993 | Overmann et al. | |
| 5,315,514 | 5/1994 | Steeby et al. | 74/336 R X |
| 5,406,861 | 4/1995 | Steeby | 74/336 R |
| 5,425,686 | 6/1995 | Grange | 74/335 X |
| 5,429,559 | 7/1995 | Steeby | 74/336 R X |
| 5,436,833 | 7/1995 | Janecke | 74/335 X |
| 5,444,623 | 8/1995 | Genise | 74/336 R X |
| 5,591,102 | 1/1997 | White et al. | 74/335 X |

FOREIGN PATENT DOCUMENTS

| | | |
|---|---|---|
| 0353310A1 | 2/1990 | European Pat. Off. . |
| 0431538A2 | 6/1991 | European Pat. Off. . |
| 0547598A1 | 6/1993 | European Pat. Off. . |

*Primary Examiner*—Dirk Wright
*Assistant Examiner*—Peter T. Kwon
*Attorney, Agent, or Firm*—Howard D. Gordon

[57] ABSTRACT

A vehicular automated mechanical transmission system (10) is provided, having a semi-automatic mode of operation wherein shifts manually selected by a selector (1) are automatically implemented and a fully automatic mode of operation, manually selected by a mode selector (48), when shifts are automatically selected and implemented. When in the fully automatic mode of operation, manual manipulation of the selector lever will cause an automatic change to the semi-automatic mode of operation.

10 Claims, 3 Drawing Sheets

CONTROL FOR AUTOMATED MECHANICAL TRANSMISSION SYSTEM

BACKGROUND OF THE INVENTION

1. Field of the Invention

The present invention relates to controls for vehicular automated mechanical transmission systems and, in particular, to controls for vehicular automated mechanical transmission systems having a fully automatic mode of operation wherein shifts are automatically selected and implemented and a semi-automatic mode of operation wherein manual selection of upshifts and downshifts from a currently engaged ratio is required and manually selected shifts are, if allowable, automatically implemented.

2. Description of the Prior Art

Fully automatic vehicular automated mechanical transmission systems wherein shifts are automatically selected and automatically implemented are well known in the prior art. Typically, such systems include a microprocessor-based controller which receives various input signals from sensors, such as signals indicative of engine and/or vehicle speed and of throttle pedal position, and processes same according to predetermined logic rules to issue command output signals to various system actuators, such as a transmission operator, a master clutch operator and/or an engine fuel controller. Examples of such fully automatic systems may be seen by reference to U.S. Pat. Nos. 3,961,546; 4,361,060; 4,595,986; 5,063,511; 5,109,729; 5,293,316; 5,305,213; 5,305,240 and 5,435,212, the disclosures of which are incorporated herein by reference.

Many vehicle operators, particularly operators of large, heavy-duty vehicles, like to control the selection of the gear ratios, particularly since they can see and/or know the nature of the road ahead and/or of the load being carried. This preference has been satisfied by the provision of a semi-automatic vehicular automated mechanical transmission control wherein automatic changing between a plurality of gear ratios is provided, while normally permitting the vehicle operator to choose when to make a particular gear ratio change and, preferably, whether to select the immediately consecutive ratio up or down or, by repetitive pulses in a given direction, to skip one or more ratios. Examples of such semi-automatic vehicular automated mechanical transmission systems may be seen by reference to U.S. Pat. Nos. 4,648,290; 4,800,360; 4,930,078 and 4,930,081, the disclosures of which are incorporated herein by reference.

While the foregoing automatic and semi-automatic mechanical transmission systems do provide desirable automated mechanical transmission control, the controls were subject to improvement in the area of allowing the vehicle operator to select operation in either the fully automatic or the semi-automatic mode of operation and/or did not allow the operator to quickly switch from one mode of operation to the other during vehicle operation.

SUMMARY OF THE INVENTION

In accordance with the present invention, the drawbacks of the prior art vehicular automated mechanical transmission controls have been minimized or eliminated by the provision of a control and control method which allow the vehicle operator to selectively operate the automated transmission system in either a fully automatic or a semi-automatic mode of operation and further, when operating in one of said modes, allow the operator to quickly select operation in the other mode. This is accomplished by providing a shift selector lever for manual control by the operator, which may be moved from a centered position in a first direction to select upshifting and in a second direction to select downshifting from a currently engaged ratio and which further includes a switch, preferably mounted on the lever itself, by which the operator may select operation in the fully automatic mode of operation. When in the fully automatic mode of operation, movement of the shift selector switch in either the upshift or downshift directions will cause the transmission to automatically implement allowable upshifts or downshifts and will cause the transmission to then operate in the semi-automatic mode of operation until such time as operation in the fully automatic mode has been reselected by the operator.

Accordingly, it is an object of the present invention to provide a new and improved control method/system for automated mechanical transmission systems having selectable, fully automatic and semi-automatic modes of operation and wherein the vehicle operator may quickly and easily change between the two modes of operation.

This and other objects and advantages of the present invention will become apparent from a reading of the following detailed description of the preferred embodiment taken in connection with the attached drawings.

DESCRIPTION OF THE PREFERRED EMBODIMENT

In the present description of the preferred embodiment, certain terminology will be used for descriptive purposes only and is not intended to be limiting. As used herein, the term "upshift" shall mean the shifting from a lower speed gear ratio into a higher speed gear ratio. As used herein, the term "downshift" shall mean the shifting from a higher speed gear ratio to a lower speed gear ratio. A "selected direction" of shifting will refer to selection of either single or multiple upshifting or downshifting from a particular gear ratio. The "displacement" between ratios refers to the number of selectable gear ratios between two given ratios (for example, third speed or gear ratio is displaced, respectively, by one and two ratios from, respectively, fourth and fifth speed in the downshift direction). A "mechanical" transmission is a transmission using positive clutches, not friction clutches, to engage and disengage selected ratios. The foregoing applies to derivatives of those terms specifically mentioned and terms of similar import.

The present invention is applicable, in principle, to the fully automatic and semi-automatic control of any type of mechanical change-gear transmission adapted for providing output signals to and receiving command signals from electric, mechanical and/or fluid-operated control devices. The present invention is particularly advantageously applied to 9-to-18-forward-speed compound transmissions typically utilized for heavy-duty vehicles of the types disclosed in U.S. Pat. Nos. 4,735,109; 4,754,665 and/or 5,390,561, the disclosures of which are incorporated herein by reference.

Figure 1:
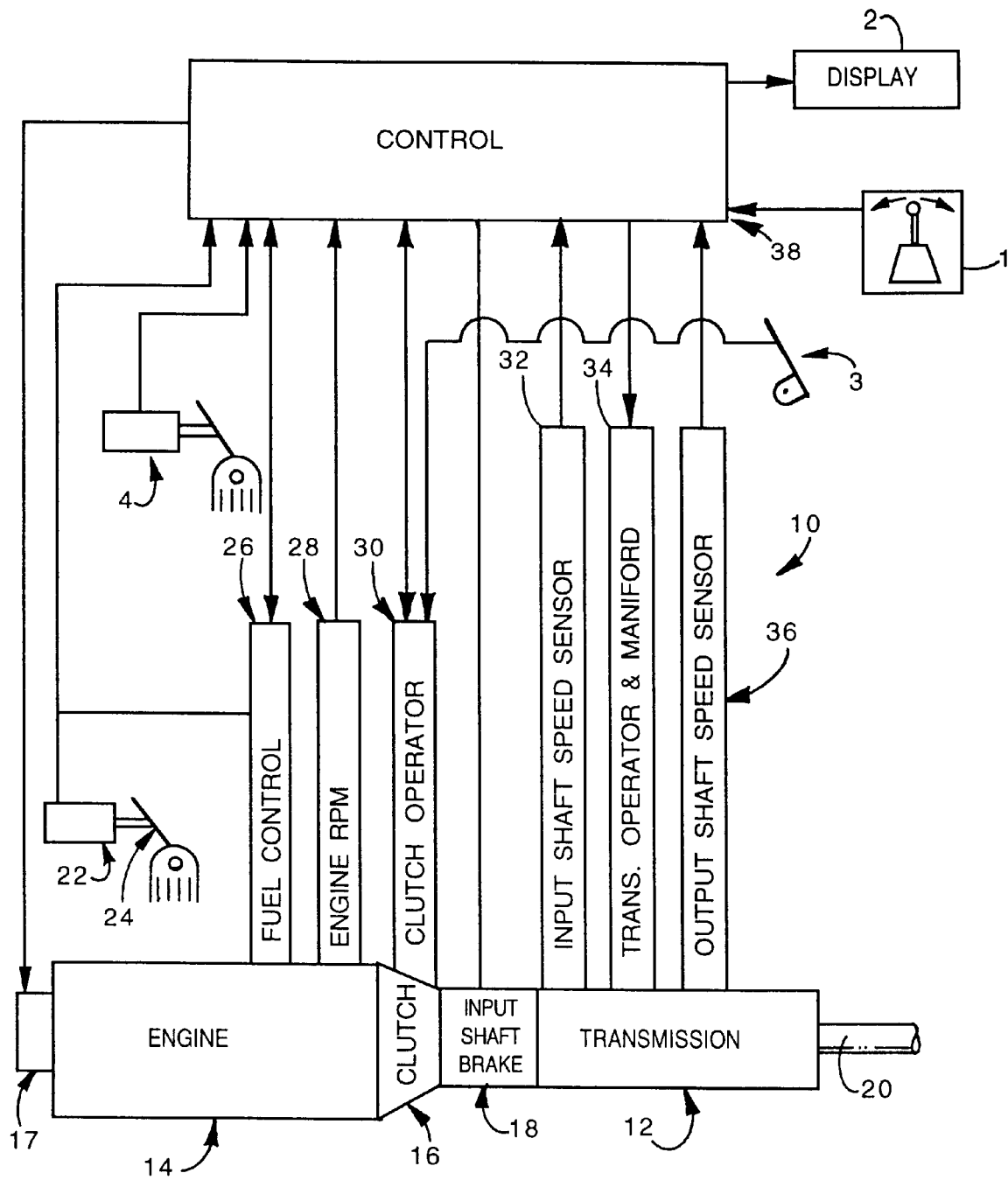
FIG. 1 is a schematic illustration of the automated mechanical transmission system of the present invention.

An automated mechanical transmission system according to the present invention may be seen by reference to FIG. 1. Automated mechanical transmission systems of this general type are disclosed in aforementioned U.S. Pat. Nos. 4,361,060 and 4,648,290.

Referring to FIG. 1, the vehicular automated mechanical transmission system 10 comprises a multiple-speed, change-gear trasmission 12 driven by a fuel-controlled engine 14 (such as a diesel engine) through a master friction clutch 16. The transmission may be provided with an input shaft brake 18 for more rapid upshifting and/or the engine may be provided with an engine or exhaust brake 17. The output of transmission is output shaft 20 adapted to be drivingly connected directly or through a transfer case to the vehicle drive axles, as is known in the prior art.

A microprocessor-based system controller 38 receives a plurality of input signals and processes same according to predetermined logic rules to issue command output signals to various system actuators. Microprocessor-based controllers of this type are well known in the prior art, and an example thereof may be seen by reference to aforementioned U.S. Pat. No. 4,595,986. The system actuators may include a fuel controller 26 for controlling the amount of fuel supplied to engine 14, a clutch actuator 30 for selectively engaging and disengaging the master clutch 16, an input shaft brake operator, a transmission operator 34 for selectively shifting transmission 12, an engine brake operator for selectively actuating the engine brake 17 and/or a display 2 for providing information to the vehicle operator. The control 38 will receive input signals indicative of system operating conditions from various sensors, such as a throttle position signal from a throttle position sensor 22 sensing the displacement of the throttle pedal 24, a foundation brake applied signal from a brake sensor 4, an engine speed signal from engine speed sensor 28, a clutch condition signal from the clutch actuator 30, an input shaft brake condition signal from the input shaft brake actuator, an input shaft speed signal from the input shaft speed sensor 32, a transmission condition signal from the transmission operator 34, an output shaft speed signal from the output shaft speed sensor 36 and/or a shift selection signal from the manually operate shift selector 1.

The system 10 may include a fully automatic clutch operator, may include an automatic clutch operator and a manually operated clutch pedal 3 (which is normally utilized only for start-from-stop operation), or may include manually-only clutch operation. The various types of clutch operation associated with system 10 may be seen by reference to U.S. Pat. Nos. 4,081,065; 4,850,236; 5,293,316; 5,335,566; 5,383,823; 5,436,833 and 5,425,689, the disclosures of which are incorporated herein by reference.

The system controller 38 may communicate with the fuel controller 26 and other system devices by means of an onboard electronic data link conforming to an industry-accepted data protocol, such as SAE J-1922, SAE J-1939 and/or ISO 11898.

Control logic circuits, sensors and actuators for the transmission system 10 may be as disclosed in aforementioned U.S. Pat. Nos. 4,361,060; 4,648,290; 4,930,078 and 4,930,081. The transmission operator 34 may be of the "X-Y" type, as illustrated in U.S. Pat. Nos. 4,873,881 and 4,899,607, the disclosures of which are incorporated herein by reference. The automated mechanical transmission system 10 also includes sources of electrical and/or pneumatic power (not illustrated).

The central processing unit may be of the type illustrated in aforementioned U.S. Pat. No. 4,595,986 and may incorporate fault detection and tolerance logic of the type illustrated in U.S. Pat. Nos. 4,849,899; 4,899,279 and 4,945,848, the disclosures of which are incorporated herein by reference.

Figure 3:
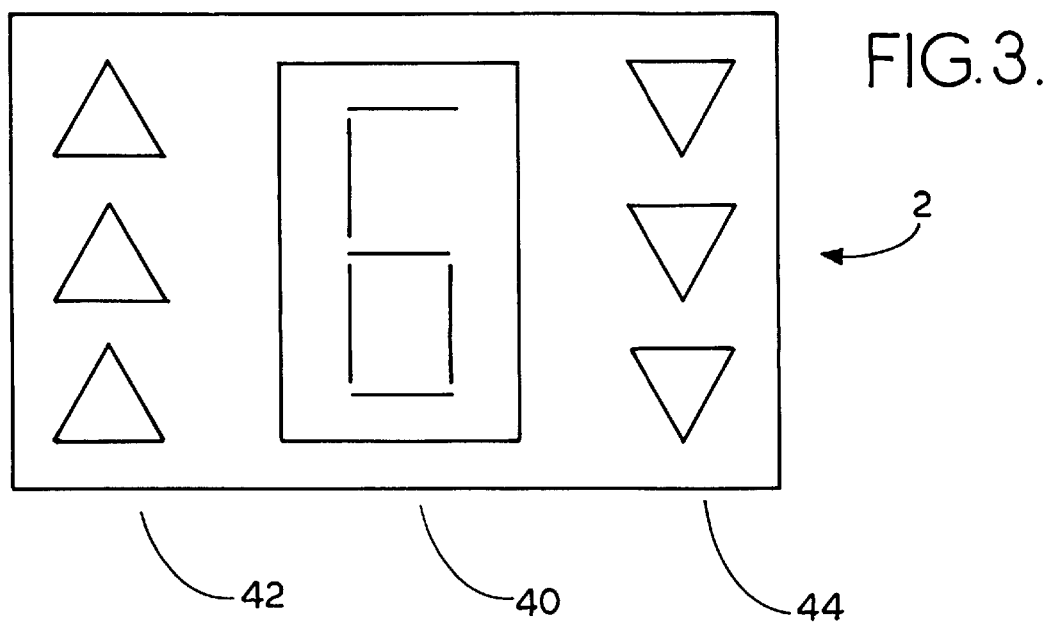
FIG. 3 is a view of the driver's display device.

A preferred embodiment of the display 2 provided to the vehicle operator may be seen by reference to FIG. 3. Briefly, the display 2 includes a section 40 displaying the currently engaged ratio, an upshift display 42 and a downshift display 44 displaying, respectively, the permissible upshifts and downshifts from the currently engaged ratio. As illustrated, the display indicates that the sixth speed ratio is currently engaged and that upshifts of one, two or three ratios, or downshifts of one or two ratios, are currently permissible. Accordingly, the transmission may be shifted to any gear ratio between fourth and ninth speeds. Typically, the permissibility of a possible upshift or downshift is determined by comparing the expected engine speed at completion of such an upshift or downshift, assuming a substantially constant or a predicted vehicle speed and fully engaged master clutch, to a fixed range of maximum or minimum permissible engine speeds. Preferably, the central processing unit 38 will not issue command signals to execute a manually selected, impermissible ratio change. Preferably, when operating in a manual shift selection mode, the central processing unit will execute the closest permissible ratio change to that selected by the operator. By way of example, assuming the conditions indicated by display 2 in FIG. 3, should the operator select a downshift to third gear, such a downshift will not be executed by the central processing unit 38 as being impermissible. However, in the preferred embodiment, the central processing unit 38 will issue command output signals for a double downshift from sixth gear to fourth gear.

Figure 2:
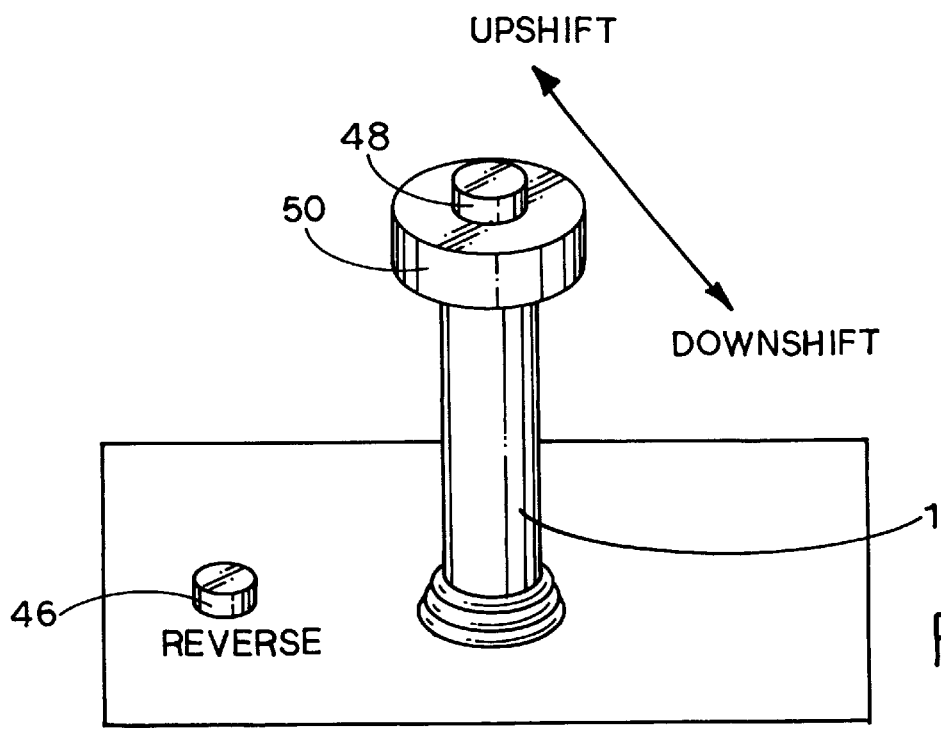
FIG. 2 is a perspective view of the driver's manual shift control.

As described more fully in aforementioned U.S. Pat. No. 4,648,290, when in a semi-automatic mode of operation, to shift transmission 12, the driver moves the lever forward (for upshifts) and rearward (for downshifts) from the position illustrated in FIG. 2. Preferably, if the operator wishes to select a direct skip shift from sixth gear to eighth gear, the lever 1 will be moved twice quickly in the upshift direction, which the control 38 will interpret and execute as a driver request for a direct upshift of two ratios from sixth gear to eighth gear. Accordingly, in the preferred embodiment of the semi-automatic mode of operation, multiple or skip shifts may be commanded by use of the semi-automatic control of the present invention. The declutching of the master clutch 16 and synchronizing of the selected jaw clutch members associated with the selected gear ratio is achieved automatically and rapidly by means of automatic throttle control, clutch control and/or braking of the input shaft and/or engine. In the semi-automatic mode of operation, the driver must exercise his discretion as to when to upshift or downshift, and as to how may gear ratios to upshift or downshift, but the driver is not called upon to coordinate gear lever, throttle pedal and clutch actuation. Once the driver has selected a permitted gear ratio, the fueling of the engine is increased to achieve necessary synchronization during a downshift, or the fueling of the engine is decreased and/or the engine brake is applied to achieve necessary synchronization during an upshift, all of which is done automatically for the driver by means of command output signals issued by the central processing unit 38.

In the preferred embodiment, the reverse mode of operation may be obtained only from neutral at a vehicle at-rest position, and then is achieved by moving the shift selector 1 in the downshift direction from a currently engaged neutral position. To prevent an inadvertent downshift into reverse, a reverse selection button 46 may be provided, which button must be depressed prior to the central processing unit 38 interpreting a downshift movement of the control lever when in neutral as a request for a shift into a reverse ratio.

It is understood that a single control lever movable forward and backward in a given direction to select forward and reverse modes of operation, and then movable in a transverse direction to select upshifts and downshifts, either single or multiple, of the type disclosed in U.S. Pat. No. 4,442,730, the disclosure of which is incorporated herein by reference, may be substituted for the control lever 1 illustrated.

The automated transmission system 10 of the present invention is also suitable for fully automatic operation wherein both shift selection and shift implementation is automatic. Such fully automated mechanical transmission systems are known in the prior art, as may be seen by reference to aforementioned U.S. Pat. No. 4,361,060. In such fully automated transmission systems, shift selection usually is based upon a plurality of input signals, such as signals indicative of vehicle and/or engine speed and of the throttle position set by the vehicle operator and, upon a determination that a shift of the transmission is required, is automatically implemented by means of command output signals issued to the engine fueling controller, a clutch controller, an input shaft brake operator and/or a transmission operator.

According to the present invention, to provide a means for selection of the fully automatic mode of operation, an automatic mode selection button 48 is provided, preferably on the knob 50 of the shift selector lever 1, by which the automatic mode of operation may be manually selected by depression of the button 48. Upon selection of the automatic mode of operation, the transmission system 10 will operate in the automatic mode until such time as the driver manually selects either an upshift or a downshift from the currently engaged ratio by moving the shift selection lever in either the upshift or the downshift direction. At such time, the requested shift will be implemented, if allowable, and the automated mechanical transmission system 10 will then operate in the semi-automatic mode of operation until such time as operation in the fully automatic mode is again requested.

Figure 4:
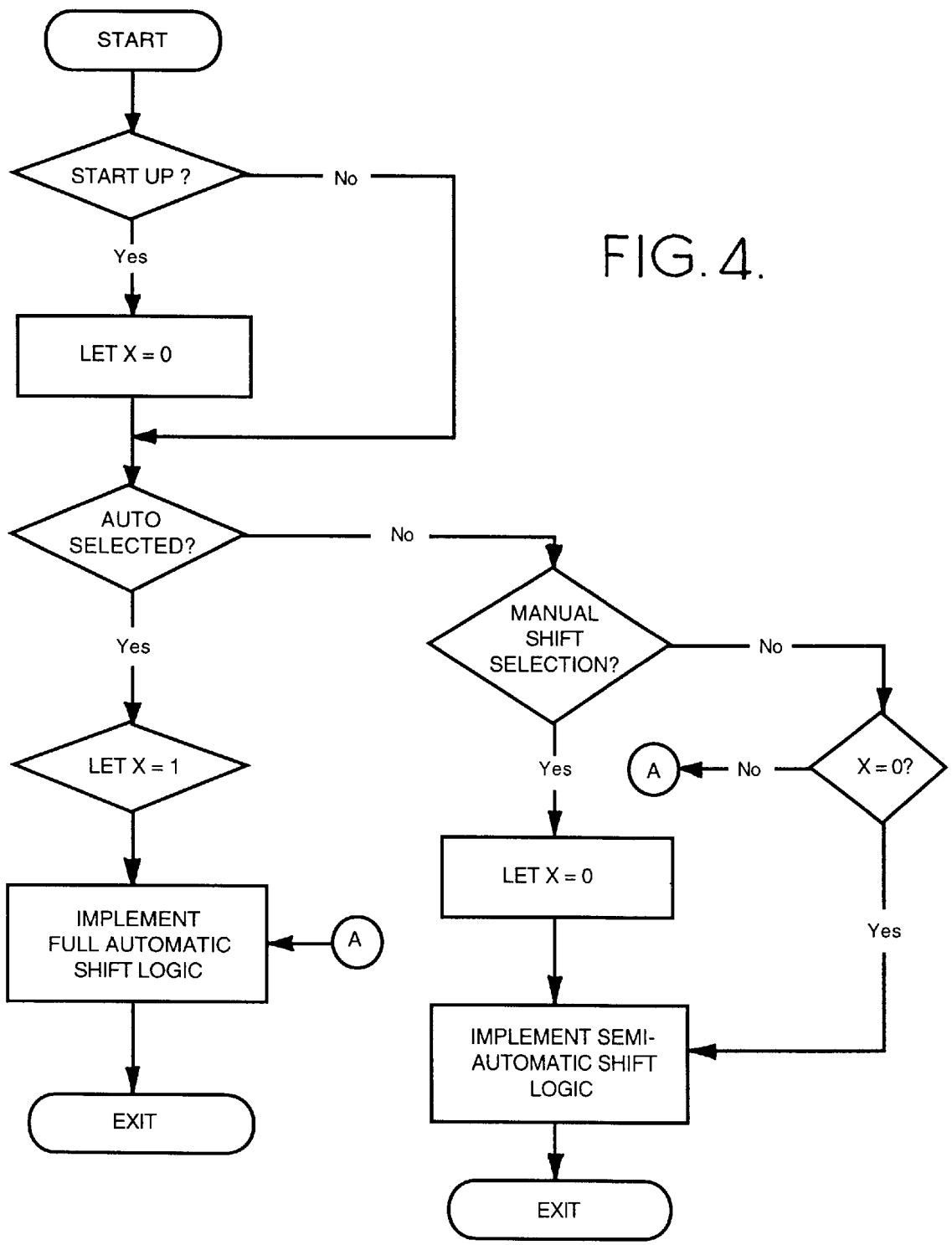
FIG. 4 is a schematic view, in flow chart format, of the automated mechanical transmission control of the present invention.

A schematic representation of the present invention, in flow chart format, may be seen by reference to FIG. 4.

Although the present invention has been described with a certain degree of particularity, it is understood that various modifications are possible without departion from the spirit and the scope of the invention as hereinafter claimed.

We claim:

1. A system for controlling a vehicular automated mechanical transmission system (10) comprising a multiple-speed, change-gear mechanical transmission (12) driven by a fuel-controlled engine (14) through a non-positive coupling (16), said system characterized by:

a manually operated shift selection lever (1) movable only along a substantially straight line in a first direction from a centered position to manually select upshifts and in a second direction from said centered position to manually select downshifts, a central processing unit (38) for receiving input signals including signals indicative of operation of said shift selection lever and for processing same according to predetermined logic rules to issue command output signals to nonmanually controlled operators including a transmission operator (34), an automatic mode selector (48) for manually selecting operation in a fully automatic mode of operation; and said logic rules including (i) rules for operation in a semi-automatic mode of operation wherein manually selected shifts are automatically implemented and (ii) rules for operation in a fully automatic mode of operation when shifts are automatically selected and implemented, said logic rules causing operation in said fully automatic mode of operation upon manual operation of said automatic mode selector and, when in said fully automatic mode of operation, causing operation in said semi-automatic mode of operation upon a manual movement of said selector lever in either of said first or second directions.

2. The system of claim 1 wherein said automatic mode selector is located on said selector lever.

3. The system of claim 2 wherein said automatic mode selector is a button located on a knob (50) of said selector lever.

4. The system of claim 1 wherein said non-positive coupling is a master friction clutch and said operators include a non-manually controlled clutch operator (30).

5. The system of claim 1 wherein manual movement of said selector lever while in the fully automatic mode of operation will also cause automatic implementation of the manually selected shift.

6. A method for controlling a vehicular automated mechanical transmission system (10) comprising a change-gear mechanical transmission (12) driven by a fuel-controlled engine (14) through a non-positive coupling (16), said method characterized by:

providing (i) a manually operated shift selection lever (1) movable only along a substantially straight line in a first direction from a centered position to manually select upshifts and in a second direction from said centered position to manually select downshifts, (ii) a central processing unit (38) for receiving input signals including signals indicative of operation of said shift selection lever and for processing same according to predetermined logic rules to issue command output signals to non-manually controlled operators including a transmission operator (34), and (iii) an automatic mode selector (48) for manually selecting operation in a fully automatic mode of operation, said logic rules including (i) rules for operation in a semi-automatic mode of operation wherein manually selected shifts are automatically implemented and (ii) rules for operation in a fully automatic mode of operation when shifts are automatically selected and implemented, and causing operation in said fully automatic mode of operation upon manual operation of said automatic mode selector and, when in said fully automatic mode of operation, causing operation in said semi-automatic mode of operation upon a manual movement of said selector lever in either of said first or second directions.

7. The method of claim 6 wherein said automatic mode selector is located on said selector lever.

8. The method of claim 6 wherein said automatic mode selector is a button located on a knob (50) of said selector lever.

9. The method of claim 6 wherein said non-positive coupling is a master friction clutch and said operators include a non-manually controlled clutch operator (30).

10. The method of claim 6 further characterized by, upon manual movement of said selector lever while in the fully automatic mode of operation, causing automatic implementation of the manually selected shift.

* * * * *